United States Patent [19]

Balde

[11] 4,201,278
[45] May 6, 1980

[54] PORTABLE ELECTRICAL CABLE INTERCONNECTION ASSEMBLY

[75] Inventor: Dan R. Balde, Flemington, N.J.

[73] Assignee: db Systems Ltd., Flemington, N.J.

[21] Appl. No.: 930,231

[22] Filed: Aug. 2, 1978

[51] Int. Cl.$^2$ .............................................. H02G 11/02
[52] U.S. Cl. ..................................... 191/12.4; 206/53
[58] Field of Search ............ 191/12.4, 12.2 R, 12.2 A; 339/119 C, 147 C, 5 RL; 206/53; 242/125.2

[56] References Cited

U.S. PATENT DOCUMENTS

| | | | |
|---|---|---|---|
| 2,923,913 | 2/1960 | Kulka | 339/198 R |
| 3,773,987 | 11/1973 | Davis | 191/12.4 |
| 4,035,050 | 7/1977 | Volinskie | 339/176 MF |

FOREIGN PATENT DOCUMENTS 265765  7/1964  Australia ................................. 191/12.4

*Primary Examiner*—Richard A. Schacher

[57] ABSTRACT

A light weight, electrical equipment, cable interconnection assembly which is easily transported and deployed for use, and which is unobtrusive when in use. It comprises a flat cable (20), including a number of parallel conductor wires, carried on a rotatable reel (10). The cable free end terminates in a connector (22) which mates with a termination box (46) to which various equipments can be connected, thus connecting them to the cable wires. The reel end of the cable terminates in a connector (24) mounted within a side plate (16) of the reel, and an electrical harness (25) is provided mating with the reel connector (24) for interconnecting the cable wires with various equipments near the reel. Stand means (34) are provided which alternately serve as means for rotatably mounting the reel or for carrying the reel, and retention means (27, 28, 29) are provided for locking the cable on the reel during shipping and handling.

7 Claims, 9 Drawing Figures

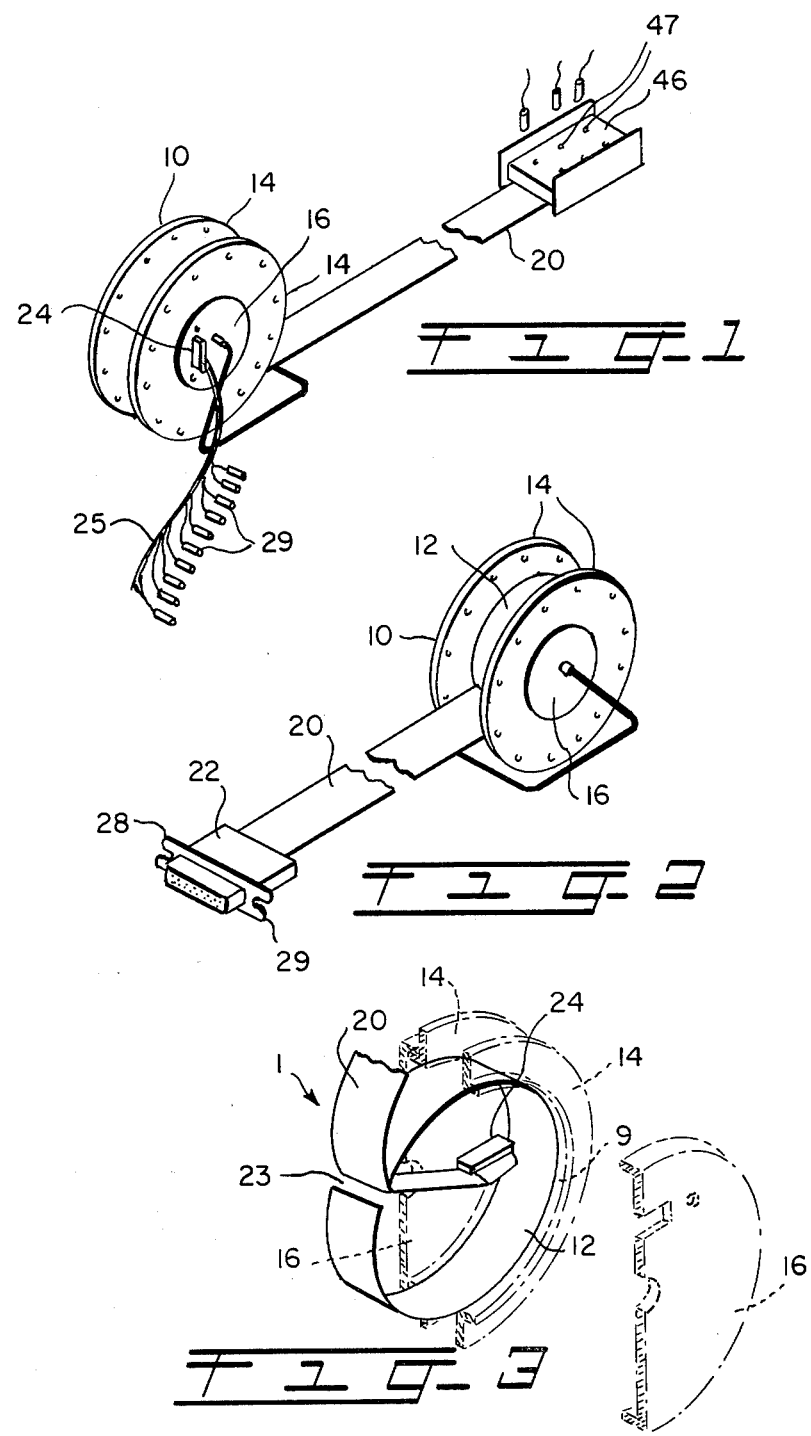

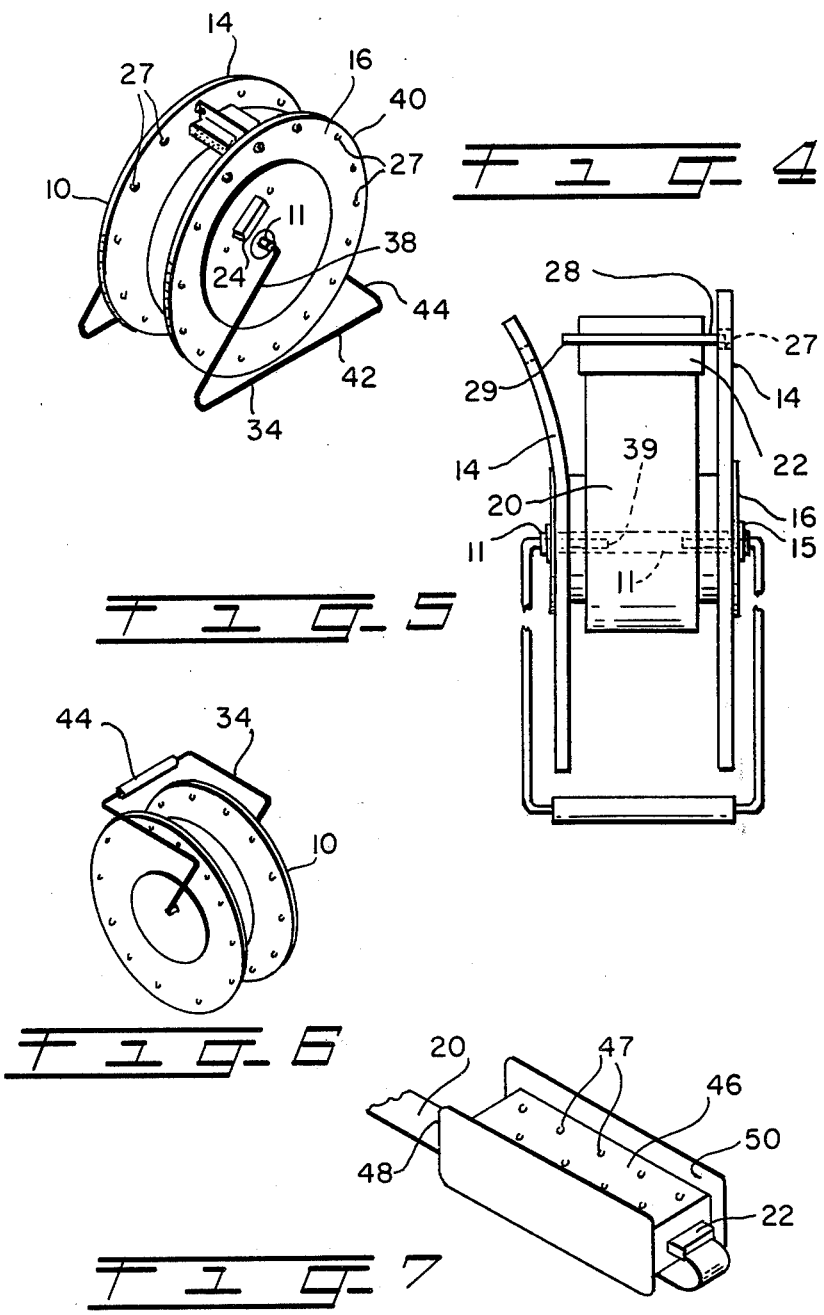

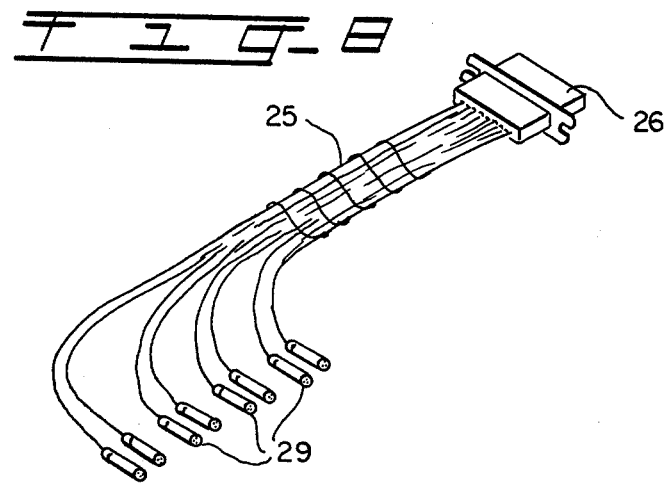
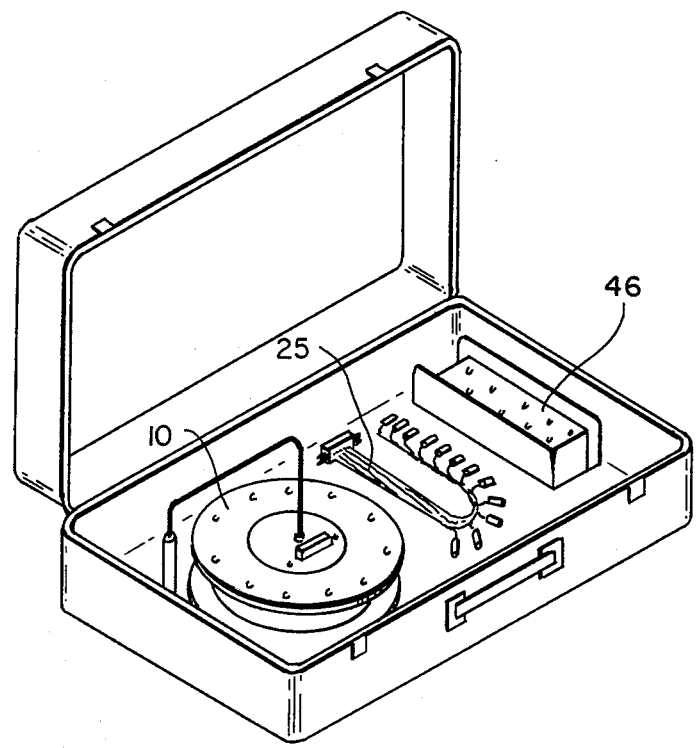

PORTABLE ELECTRICAL CABLE INTERCONNECTION ASSEMBLY

TECHNICAL FIELD

This invention relates to an improved portable cable assembly, and particularly, although not limited to, a portable cable assembly having utility in transportable sound systems for connecting together separately located components of such systems.

BACKGROUND OF THE INVENTION

In portable sound reinforcement systems used in auditoriums and the like, where a sound mixing console may be placed 50 to 200 feet in front of the stage for sound balancing, an electrical cable is used to interconnect the mixing console with the stage located equipment. The usual connecting cable comprises a number of individual conductor wires bound together in a large, stiff bundle having a generally circular cross-section, the various wires being connected to multiple connection connectors at each end of the cable. This type of circular cross-section cable assembly is commonly called a "snake" because it is difficult to deploy and even more difficult to stuff into a carrying case. It presents a tripping hazard, is heavy, bulky, and is not only awkward to handle, but requires a large trunk for transporting and storage.

Many of these problems would be avoided by the use of a thin, flat cable, such as those which have been developed for use in the telephone industry, in substitution for the "hose-like" cable presently used. This substitution has not yet occurred because suitable related cable handling and deploying means have not existed. An object of this invention is to provide such suitable handling and deploying means.

SUMMARY OF THE INVENTION

A cable assembly for use with a flat cable comprises a reel including a drum mounted between a pair of circular side plates. A flat cable is provided adapted for being wound onto and off the drum, the inner end of the cable extending through an elongated slot through the drum and to one of the side plates where it terminates in a connector mounted within a slot through the plate. The other end of the cable terminates in a connector having extending ear portions which cooperate with holes through the side plates for locking the cable on the reel during handling and storage of the assembly. For rotatably mounting the reel, a support member is provided which includes a central axle member for the reel and a pair of radially extending side members which terminate in a support base. The support member alternately serves as a carrying handle for the reel. Electrical connections to the wires within the cable are by means of a termination box to which the cable free end connector is detachably connectable, and an electrical harness having a connector which is detachably connectable to the connector on the reel side plate, the harness, in turn having a connector for each of the individual circuits connected through the cable.

BRIEF DESCRIPTION OF THE DRAWING

FIGS. 1, 2, 4, and 6 are views in perspective showing the reel portion of the assembly and various other portions of the assembly used in connection with the reel;

FIG. 3 is a view in perspective, and partly exploded, showing the reel and the mounting of the cable on the reel;

FIG. 5 is a side elevation of the reel showing the locking of the cable of the reel; and FIGS. 7, 8, and 9 are views in perspective showing, respectively, the termination box, the electrical harness, and the storage of the disassembled assembly in a carrying case.

DETAILED DESCRIPTION

With reference to FIGS. 1, 2, and 3, a reel assembly according to this invention is shown which comprises a reel 10 which includes a hollow drum 12 mounted between a pair of circular side plates 14, and a flexible, flat cable 20 which is affixed at its inner end to the reel 10 and which is of a width to substantially, but not quite, fill the space between the side plates 14.

The ends of the drum 12 fit tightly within openings (FIG. 3) through the side plates 14 which are rigidly attached, as by gluing, to the drum. The side plate openings provide access to the inside of the drum for ease of replacement of the cable, as described hereinafter. To close the side plate openings, the side plates 14, which are preferably of a molded plastic material, are each provided with a ridge 9 which extends around the periphery of the opening and which serves as a seat for an edge lipped hub plate 16 which fits relatively snugly around the side plate ridge.

To secure the hub plate 16 in place, an externally threaded tubular member 11 (FIG. 5) is provided which extends axially through the drum 12 and through a central opening through each of the hub plates 16. Nuts 15 are threaded onto the ends of the tubular member and tightly against the hub plate 16 (preferably of steel), thereby firmly clamping the hub plates 16 in place.

The flat cable 20 used with the assembly can be of a known type. In general, it comprises a plurality of parallel, coplanar, insulated, solid wires arranged in pairs, the wires being embedded within a thin layer of a tough polymeric material, such as mylar (polyethylene paraphthlate).

A suitable commercially available cable of this type, generally known for use in telephone systems applications, has a width of 2¼", and consists of 50 conductors arranged in 25 pairs of wires each of which is a 26-gauge solid conductor of round drawn copper. Such cable is quite thin, having a thickness of 0.040". Notwithstanding its thinness, it is quite strong and tough, and may be walked on with little danger of damage thereto.

The free or leading end of the cable 20 terminates (FIG. 2) in a known type connector 22 (such as, for example, the CHAMP connector 552032-1 sold by AMP, INC., Harrisburg, Pa.), by means of which electrical connections can be made to the individual wires within the cable.

The drum 12 has an elongated slot 23 (FIG. 3) therethrough through which the inner end of the cable 20 extends, the cable then changing direction (by means of a diagonal fold) and extending through the side plate 14 to the hub plate 16 where it terminates in a known type connector 24 (e.g., number 229975-1, sold by AMP, INC., Harrisburg, Pa.) mounted within a slot 16' through the hub plate 16.

An advantage of this arrangement is that, by removal of the hub plate 16, access is provided to the interior of the drum 12 thereby allowing ready replacement of the cable or the connector 24 as may be required. Although both side plates 14 are shown herein with control openings therethrough, thus requiring two hub plates 16, one of the side plates can be substantially solid, except for a small central opening for receipt of the hub 11, and only one hub plate 16 is used. Alternately, the hub plates 16 can be integral with the side plates 14.

Connections to the individual wires of the cable 20 at the reel 10 can be made via a known type of distribution cable cluster or "harness" 25 (FIGS. 1 and 8) detachably connectable to the connector 24 by means of a mating connector 26 identical to, for example, the connector 22. The harness 25 includes a number of wires each terminating in an individual known type male connector 29 which can be inserted into mating connectors of one or more equipments located near the reel, e.g., a known type of sound mixer.

One feature of this embodiment of the cable assembly relates to the means for locking the cable 20 in place on the reel 10 when the cable is fully wound thereon. As shown in FIG. 4, the side plates 14 are provided with a number of holes 27 which extend around the complete circumference of the plates, each hole 27 in one plate being aligned with a corresponding hole in the other plate. These holes are designed to receive projecting ends or "ears" 28 and 29 (FIGS. 2 and 5) of the cable free end connector 22 as follows:

As shown in FIG. 5, the spacing between the side plates 14 is slightly greater than the width of the flat cable 20 and the main body portion of the cable connector 22, but is slightly smaller than the total width of the connector 22 including its extending ear portions 28 and 29. Thus, to lock the cable 20 on the reel 10, one ear portion 28 is first inserted into a nearby side plate hole 27, such as is shown on the right-hand side of FIG. 5, and the opposite side plate is then outwardly flexed, by hand, to allow insertion of the other ear portion 29 into an aligned hole 27 in the flexed plate. Only a small flexure is required, this being provided by the normal resiliency of the side plate material. A sufficient number of holes 27 is provided around the side plates 14 so that the end connector 22 can be secured at any of a number of positions, as determined by how tightly the cable is rolled at any instance onto the reel.

For either rotatably supporting the reel 10, or serving as a convenient means for carrying it, a combined handle and stand member 34 (FIG. 4) is provided. The stand member 34 is formed from a solid rod or tubular member and includes two side members 38 each of which has an axially bent inward portion 39 (FIG. 5) which extends into the reel central hub 11 and which provide provide an axle about which the reel can rotate. The two members 38 extend radially along the outside of the two side plates 14 to a distance beyond the outer edge 40 thereof where they are joined by a generally U-shaped member. This member includes leg portions 42 which extend generally perpendicular to the side members 38, and which are joined by a base member 44 which extends generally parallel to the central axis of the reel. In the position shown in FIG. 4, the stand member 34 serves as a support for the reel assembly, the reel 10 being freely rotatable about the stand axle portions 39 for winding and unwinding the cable 20 onto or off the reel. Conversely, in the position of the stand 34 shown in FIG. 6, it serves as a handle for carrying the assembly.

Alternatively, the two axle members 39 can comprise a single member extending entirely through the hub 11, in which case, for convenience of disassembling and storage, other portions of the stand structure may be separable from one another.

A further portion of this embodiment of the reel assembly is a termination box 46 (FIGS. 1 and 7) into which the cable free end connector 22 is insertable for connecting individual wires in the cable to individual terminal receptacles 47 in the box 46. The termination box 46 is normally mounted on the stage of the auditorium in which the reel assembly is used, and, for example, electrical cords from various sound systems and instruments on the stage are plugged into the box 46 and thus connected, via the cable 20, to an audio system console connected to the harness 25. Such box can also contain impedance matching transformers, special circuits or other interconnections as required.

The termination box 46 is basically of known design, but, for a reason described hereinafter, is provided with two side flanges 48 and 50 which extend beyond the upper and end surfaces of the box 46.

In use of the reel assembly, for example, as a mixer cable in an audio sound reinforcement system, the termination box 46 is placed on the stage, and the reel 10 is mounted on its stand 34 adjacent to the mixer console spaced away from the stage. The cable free end connector 22 is unlocked from between the side plates 14, and the cable 20 unreeled from the freely rotatable reel 10 and carried to the stage where the connector 22 is plugged into the box 46. As shown in FIG. 7, the cable 20 preferably passes beneath the box 46, the box 46 thus serving to maintain the cable flat against the floor. Tape or other suitable means can be used to hold the remaining length of the cable flat on the floor. The two termination box flanges 48 and 50 are effective to protect both the cable connector 22 and the various cord plugs against damage by kicking, falling objects, and the like. The harness 25 is then used to connect the reel end of the cable 20 to the mixer console.

In comparison with prior art connector assemblies using the aforedescribed "snakes", the assembly of the instant invention is extremely easy to deploy and, once in place, is practically unnoticeable and of such low profile as to constitute a negligible tripping hazard.

To pack up the assembly, the connector 22 and harness 25 are unplugged, the cable 20 is wound onto the reel 10 by rotating the reel within its stand 34, and the connector 22 then locked in place between the side plates 14. The stand member 34 is thus used as a convenient means for carrying the wound reel.

FIG. 9 shows how the reel 10, the termination box 46, and the mixer cable harness 25 can all be packed in a small suitcase or attache case for easy transport and handling. Such an assembly can occupy a volume of about one cubic foot, whereas the comparable prior art stage-to-mixer cable of 150-foot length requires a shipping truck of at least six cubic feet. In addition to the significant size reduction, there is a substantial weight reduction.

While a preferred embodiment of the invention includes all the herein described portions, e.g., the reel 10, the cable 20 and its connectors 22 and 24, the termination box 46, and the harness 25, various changes in the assembly can be made without departing from the spirit of the invention. For example, the cable 20 can extend through the hub plate 14 and itself connect to other equipment. Similarly, depending upon the types of equipments being interconnected, different terminal connectors 22 and 24 can be used, and a different termination box 46, or none at all, can be used.

Also, while the invention has been described in connection with an audio sound system, it can be used in numerous applications where multiple equipments, e.g., various transducers, disposed in one area are to be connected to one or more equipments, e.g., recording devices, located at a different area.

What is claimed is:

1. An electrical cable assembly comprising a rotatable reel including a drum mounted between a pair of side plates, and a flat, wire-containing cable adapted for being wound onto and from the drum, the outer end of said cable terminating in a first connector member providing electrical access to the wires of said cable, said connector member having a pair of ears extending in opposite directions, the distance from end to end of said ears being greater than the distance between said side plates, and each of said side plates having a number of openings therethrough spaced thereabout, each opening in one of said side plates being aligned with a corresponding opening in the other of said side plates, and said ears being dimensioned to fit within any of said aligned pairs of openings for locking said cable to said reel.

2. An assembly as in claim 1 wherein at least one of said side plates has an opening therethrough exposing the drum interior, and a closure plate removably secured to said one side plate for closing said opening, the inner end of said cable extending into the drum interior, through said side plate opening, and to a slot through said closure plate for providing electrical access to the wires of said cable.

3. An assembly as in claim 2 including a second connector to which said cable inner end is secured mounted within said slot through said closure member, and including a wire containing harness having a third electrical connector at one end thereof, said third connector being detachably matable with said second connector for interconnecting different ones of the wires within said cable to different ones of the wires of the harness.

4. An electrical cable assembly as in claim 1 including a tubular hub extending axially through said drum and through said side plates and secured to said side plates, and a stand member comprising a pair of side members extending radially along and outside of said side plates, each of said side members terminating at its radially inner end with an axle means cooperating with said hub to provide means about which said reel rotates, and terminating at its radially outer end in a base member for rotatably supporting said reel.

5. An assembly as in claim 1 including a terminal box having a side surface including connector means to which said connector member is detachably matable, said terminal box including a number of receptacles at an upper surface thereof for receipt of electrical wires to be interconnected to different ones of said cable wires, and said box including at least one flange which extends beyond said surfaces for preventing damage to said receptacles and to said connector member during use of said assembly.

6. An electrical cable assembly comprising a rotatable reel including a hollow drum mounted between a pair of side plates, and a flat, wire-containing cable adapted for being wound onto and from the drum, the inner end of said cable extending to a slot through one of said side plates and terminating thereat in a first electrical connector, an electrical harness including a plurality of wires terminating in a second electrical connector detachably matable with said first connector for electrically connecting to individual ones of said cable wires, the outer end of said cable terminating in a third connector having extending ears adapted to cooperate with holes through the side plates for locking said cable to said reel, a terminal box including a fourth connector member to which said third connector is detachably matable, said terminal box including receptacles for receipt of electrical cords to be interconnected with different ones of the wires of said cable, and a stand member including an axle member extending axially through said drum and about which said reel is rotatably mounted, and side members secured to said axle member and extending radially beyond the outer edges of said side plates and terminating in a base member for providing means on which said reel can be rotatably mounted or, alternatively, providing means by which said stand can be hand carried.

7. An electrical cable assembly comprising a rotatable reel including a hollow drum mounted between a pair of side plates, and a flat, wire-containing cable adapted for being wound onto and from the drum, the inner end of said cable extending to a slot through one of said side plates for providing electrical access to the wires of said cable, and the outer end of said cable terminating in a connector, said connector having a pair of ears extending in opposite directions, the distance from end to end of said ears being greater than the distance between said side plates, and each of said side plates having a number of openings therethrough spaced thereabout, each opening in one of said side plates being aligned with a corresponding opening in the other of said side plates, and said ears being dimensioned to fit within any of said aligned pairs of openings for locking said cable to said reel; and a terminal box having a side surface including connector means to which said connector is detachably matable, said terminal box including a number of receptacles at an upper surface thereof for receipt of electrical wires to be interconnected to different ones of said cable wires, and said box including at least one flange which extends beyond said surfaces for preventing damage to said receptacles and to said connector member during use of said assembly.

* * * * *